M. C. MAYO & B. NOYES.
Device for Suspending Swings, &c.

No. 216,624.                     Patented June 17, 1879.

Witnesses.

Inventors.
M. C. Mayo and Benj. Noyes.
J. Curtis. Atty.

UNITED STATES PATENT OFFICE.

MATTHIAS C. MAYO AND BENJAMIN NOYES, OF BOSTON, ASSIGNORS OF FIVE-SIXTHS THEIR RIGHT TO GRANVILLE M. THOMAS, OF MELROSE, AND ONE-SIXTH TO JAMES PITTS BRIDGE, OF TYNGSBOROUGH, MASS.

IMPROVEMENT IN DEVICES FOR SUSPENDING SWINGS, &c.

Specification forming part of Letters Patent No. 216,624, dated June 17, 1879; application filed February 25, 1879.

*To all whom it may concern:*

Be it known that we, MATTHIAS C. MAYO and BENJAMIN NOYES, of Boston, county of Suffolk, and State of Massachusetts, have invented a certain Device for Suspending Swings, &c., of which the following is a specification.

The invention is a portable device for suspending various objects in a swinging manner from the tops of doorways, limbs of trees, or other points, the device being especially intended to afford amusement to children indoors or in sheltered localities in inclement weather, but applicable to the suspension of ornaments and other objects.

The invention consists, primarily, in two curved arms or jaws, hinged together at their lower ends and provided at the point of union with a hook or swivel for attachment of a rope or chain, such arms being susceptible of expansion and contraction at their free ends with respect to each other, in order to embrace and cling to the desired object and draw together by a spring to prevent losing hold of their support.

The invention also consists in certain details of construction, to be hereinafter explained.

Figure 1:
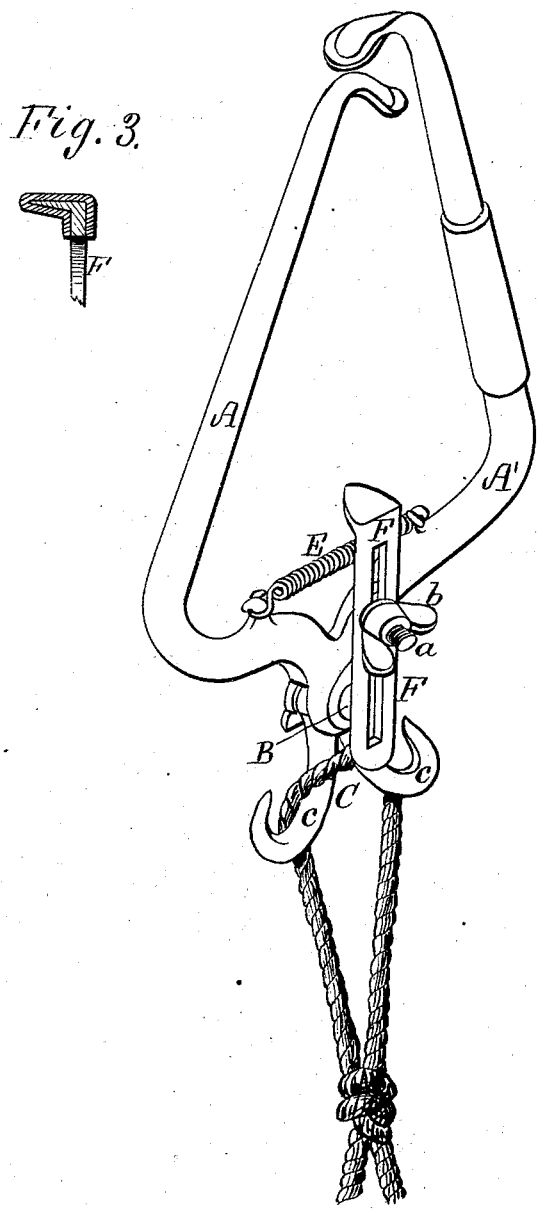
Figure 2:

The drawings accompanying this specification represent, in Figures 1 and 2, elevation and vertical sections of a device embodying our invention.

In these drawings, A A' represent two curved arms or jaws, pivoted together at their lower ends, as shown at B, by which they are connected together and permitted to approach or recede from one another at their upper or free ends, while the pivot further serves to support a hook or swivel, C, to which a rope or chain may be attached when an object is to be suspended.

Figure 3:
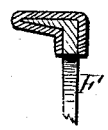
Figure 4:
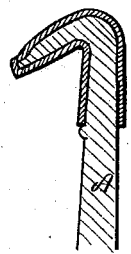

The upper extremities of the arms are to be turned inward toward each other, and otherwise shaped to adapt themselves to the best advantage to the ledge of the top of a doorway or the limb of a tree, &c., and should be provided with rubber pads, as shown in Figs. 3 and 4 of the drawings, to prevent injury to the woodwork, as well as, to some extent, slipping and noise, and provide a certain degree of elasticity, which, in the case of a child's swing, adds considerably to the ease of motion of the latter, while a coiled spring, E, is introduced between the arms above the pivot and secured at opposite ends to them, and serves to draw them toward each other and about the object to which they cling, such spring serving to prevent slipping and escape of the arms from their support.

It frequently happens that one side of the upper part of a door-frame or other support to which the device is to be attached is higher than the opposite side; and to adapt the device to this unequal height we construct one of the arms in two parts, as shown in Fig. 2 of the drawings, and provide the two with a suitable union or joint, which shall enable the arm to be expanded or contracted in length.

To prevent swaying of the device upon its support, as well as to obviate danger of injury to the latter, and tendency to escape of the arms therefrom, we employ a stop or bearer composed of a vertical slotted bar, F, straddling a stud, *a*, projecting laterally from the lower part of one of the arms, and clamped to the latter by a thumb-nut, *b*, the upper end of such bar being flat and sufficiently large to afford a good bearing upon the under side of the support; and we prefer to secure to such upper end an elastic pad or shoe, to prevent defacement of the said support, as shown in Fig. 3. This stop-bar is to be crowded tightly up against the under side of the support of the device, and clamps the latter rigidly to such support.

To equalize the draft of the suspensory-rope upon the pivot B, we employ a double hook, as shown at *c c*, and we loop the end of the rope to these hooks practically as shown, by which the strain is transferred alternately from one to the other, and the line of draft becomes more nearly vertical than if a single hook were employed.

If the above-described device is to be used to support a child's swing, two of such devices are employed, and applied one to each side of the upper part of the door-frame by passing the upper part of the arms over opposite sides of such frame, which serves to inclose the latter between them. The ends of the swing-rope are looped and secured one to each hook, and the swing thus becomes suspended in the doorway and available for use.

To suspend a flower-pot, for instance, but one device is required.

We claim—

1. A device for suspending various objects in a swinging manner, composed of two curved arms, pivoted together at their lower ends and adapted at their upper or free ends to clasp a suitable support, and also provided at their conjoint lower ends with a hook or its equivalent for attachment of a rope or chain, and with a suitable spring to draw them together.

2. The stop or bearer, as used for purposes stated.

3. The curved arm as made sectional and provided with a suitable lock-joint, by which it is susceptible of expansion or contraction in the direction of its length.

4. The double hook, in combination with the hinged curved arms.

5. The device consisting in the combination of the following elements: the hinged curved arms, the stop or bearer, and the hook, essentially as and for purposes stated.

MATTHIAS C. MAYO.
BENJAMIN NOYES.

Witnesses:
LOUIS A. CURTIS,
F. HUNNEWELL.